(12) United States Patent
Mraz et al.

(10) Patent No.: US 9,596,245 B2
(45) Date of Patent: Mar. 14, 2017

(54) SECURE ONE-WAY INTERFACE FOR A NETWORK DEVICE

(71) Applicant: Owl Computing Technologies, Inc., Ridgefield, CT (US)

(72) Inventors: Ronald Mraz, South Salem, NY (US); Gabriel Silberman, Hastings on Hudson, NY (US)

(73) Assignee: Owl Computing Technologies, Inc., Ridgefield, CT (US)

( * ) Notice: Subject to any disclaimer, the term of this patent is extended or adjusted under 35 U.S.C. 154(b) by 446 days.

(21) Appl. No.: 13/856,493

(22) Filed: Apr. 4, 2013

(65) Prior Publication Data

US 2014/0304371 A1    Oct. 9, 2014

(51) Int. Cl.
*G06F 15/16* (2006.01)
*H04L 29/06* (2006.01)

(52) U.S. Cl.
CPC ............ *H04L 63/105* (2013.01); *H04L 63/02* (2013.01)

(58) Field of Classification Search
CPC .......................... H04L 41/0213; H04L 41/046
See application file for complete search history.

(56) References Cited

U.S. PATENT DOCUMENTS

| 5,703,562 | A | 12/1997 | Nilsen |
| 5,835,696 | A | 11/1998 | Hess |
| 6,414,958 | B1 | 7/2002 | Specht |
| 6,466,583 | B1 | 10/2002 | Laraqui |
| 7,290,142 | B1 * | 10/2007 | Yost .............................. 713/171 |
| 7,450,438 | B1 | 11/2008 | Holst et al. |
| 7,606,884 | B2 | 10/2009 | Palmer et al. |
| 8,068,415 | B2 | 11/2011 | Mraz |
| 8,094,675 | B2 | 1/2012 | Spivey |
| 8,327,007 | B2 | 12/2012 | Liu et al. |
| 2005/0015624 | A1 * | 1/2005 | Ginter et al. .................. 713/201 |
| 2006/0039313 | A1 * | 2/2006 | Chou et al. .................... 370/328 |
| 2009/0113500 | A1 * | 4/2009 | Frenkel et al. ................ 725/109 |
| 2012/0017079 | A1 * | 1/2012 | Mraz et al. .................... 713/153 |
| 2013/0054957 | A1 * | 2/2013 | Boring ................ H04L 63/0209 713/150 |

* cited by examiner

*Primary Examiner* — Brian Whipple
*Assistant Examiner* — Anthony Rotolo
(74) *Attorney, Agent, or Firm* — John S. Economou

(57) ABSTRACT

A one-way interface for a network device which secures status registers therein from unauthorized changes. The interface includes a first server, a one-way data link and a second server. The first server is coupled to the status registers to read information stored therein. The first server reads the information from the status registers and transmits the information on an output. The one-way data link has an input coupled to the output of the first server and an output. The second server has an input coupled to the output of the one-way data link and an output coupled to a network. The second server receives the information from the first server via the one-way data link. The second server transmits the information on the output to a predetermined network destination and/or provides a user interface for providing access to the information via the network.

20 Claims, 2 Drawing Sheets

SECURE ONE-WAY INTERFACE FOR A NETWORK DEVICE

FIELD OF INVENTION

This invention relates generally to a secure one-way interface for a device coupled to a network and capable of outputting status information.

BACKGROUND OF THE INVENTION

Computer networks are capable of coupling many different types of devices, including, but not limited to, routers, workstations, servers, switches, bridges, hubs, IP telephones, IP video cameras, computer hosts, modem racks and printers. It is often desirable to obtain status information about the devices coupled to a network, and, in particular, to monitor such devices to detect the occurrence of conditions that warrant administrative attention. Simple Network Management Protocol (SNMP) is an Internet-standard protocol that was developed for managing devices on computer networks. In a typical SNMP application, one or more administrative computers (managers) are tasked with monitoring one or more devices on a computer network (the managed devices). A network management system (NMS) runs on the administrative computer which communicates with agent software modules running on the managed devices. Communications between the administrative computer and a managed device may be based upon an explicit request, with the administrative computer issuing a request for information and the managed device responding to the request, or pushed, with the managed device providing an asynchronous notification to the administrative computer (an SNMP Trap message). The data that may be collected about routers and switches using SNMP can be invaluable to network administrators. However, utilizing SNMP could make a network vulnerable to security attacks, if the security features of SNMP are not enabled or not properly enabled. For example, the first two versions of SNMP provided for a community string (i.e., a password) and for an access list of authorized devices. Even if the community string is enabled, there still could be some vulnerability, as some users fail to change the default password and a packet analyzer might be used to detect the community string within the network traffic. Further, the access list can be overcome by spoofing. Version three of SNMP provides more robust security, but can be more difficult to set up and enable. Furthermore, all three versions of SNMP are subject to brute force and dictionary attacks for guessing the community strings, authentication strings, authentication keys, encryption strings or encryption keys because no challenge-response handshake is required.

Highly engineered solutions, such as the Owl Computing Technologies Dual Diode, (described in U.S. Pat. No. 8,068, 415, the disclosure of which is incorporated herein by reference) provide a direct point-to-point optical link between network domains in the low-to-high direction or in the high-to-low direction. The unidirectionality of the data transfer is enforced in the circuitry of the network interface cards at both network endpoints and in the cable interconnects. In this way, the hardware provides an added layer of assurance of unidirectional information flow and non-bypassable operation. In contrast to software based one-way data transfer systems, it is easy to prove that data is not bypassing the Dual Diode.

In such systems, shown as system 100 in block diagram form in FIG. 1, a first server (the Blue Server) 101 includes a transmit application 102 for sending data across a one-way data link, e.g., optical link 104, from a first network domain coupled to server 101 to a second network domain coupled to server 111. First server 101 also includes a transmit (here a phototransmission) component, e.g., optical emitter 103. Transmit application 102 provides data to the optical emitter for transmission across the optical link 104. A second server (the Red Server) 111 includes a receive (here a photodetection) component, e.g., optical detector 113, for receiving data from the optical link 104, which data is then provided to the receive application 112 for further processing. The first server 101 is only able to transmit data to second server 111, since it does not include any receive circuitry (e.g., an optical detector comparable to detector 113) and the second server 11 is only able to receive data from first server 101, since it does not include any transmit circuitry (e.g., an optical emitter comparable to emitter 103).

It is an object of the present invention to provide a more secure interface for outputting status information from a network device that overcomes the problems with SNMP discussed above.

SUMMARY OF THE INVENTION

The present invention provides a secure one-way interface for a network device which includes status registers. The interface includes a first server, a one-way data link and a second server. The first server is coupled to the status registers to read the information stored in the status registers. The first server is configured to read the information from the status registers and transmit the information on an output. The one-way data link has an input coupled to the output of the first server and an output. The second server has an input coupled to the output of the one-way data link and an output coupled to a network. The second server is configured to receive the information from the first server via the one-way data link. The second server is further configured to transmit the information on the output to a predetermined network destination. In the alternative (or in addition), the second server is configured to provide a user interface for allowing a user to read the stored information via the network.

The first server may be configured to repeatedly read and transmit the information from the status registers on a predetermined basis. The predetermined basis may be a predetermined fixed interval or a fixed schedule. In an alternative embodiment, the first server may include a memory for storing the information and may be configured to repeatedly read the information from the status registers at a predetermined fixed interval, to compare the read information with the stored information, and, only if the read information is different from the stored information, to forward the read information on the output and to replace the previously stored information with the read information.

In a still further alternative embodiment, the second server may include a memory for storing the information and may be configured to receive the information from the first server, to compare the read information with the stored information, and, only if the read information is different from the stored information, to transmit the read information on the output and to replace the previously stored information with the read information.

The second server may include a storage device and wherein the second server may be configured to store the received information along with identifying information on the storage device. Further, the second server may be configured to allow the user to request information based upon the identifying information.

In a further embodiment, the secure one-way interface may further comprise a second one-way data link having an input coupled to an output on the second server and an output coupled to an input on the first server. In this further embodiment, the second server may further be configured to allow a user to enter a command for changing at least part of the information stored in the status registers and to transmit the entered command to the first server via the second one-way device. In addition, the first server may further be configured to receive the command via the second one-way data link and to cause the command to be executed. In a still further embodiment, the second server may be configured to require that the user enter a password before allowing the user to select or enter the command. In yet a still further embodiment, the first server may include a memory for storing the information and be configured to repeatedly read the information from the status registers at a predetermined fixed interval, to compare the read information with the stored information, and, only if the read information is different from the stored information, to forward the read information on the output and to replace the previously stored information with the read information. Still further, communications to the second interface may be encrypted.

The information stored in the status register may comprise status information and identification information. The identification information may comprise a MAC address. The second server may be configured to transmit the information in the form of an SNMP Trap message.

In an alternative embodiment, the secure one-way interface may include a second one-way data link having an input coupled to an output on the second server and an output coupled to an input on the first server. In this embodiment, the second server may further be configured to allow a user to enter a command for changing the predetermined basis and to transmit the entered command to the first server via the second one-way device. Similarly the first server may further be configured to receive the command via the second one-way data link and to change the predetermined basis.

BRIEF DESCRIPTION OF THE DRAWINGS

The following detailed description, given by way of example and not intended to limit the present invention solely thereto, will best be understood in conjunction with the accompanying drawings in which.

DETAILED DESCRIPTION OF THE PREFERRED EMBODIMENTS

In the present disclosure, like reference numbers refer to like elements throughout the drawings, which illustrate various exemplary embodiments of the present invention.

Figure 1:
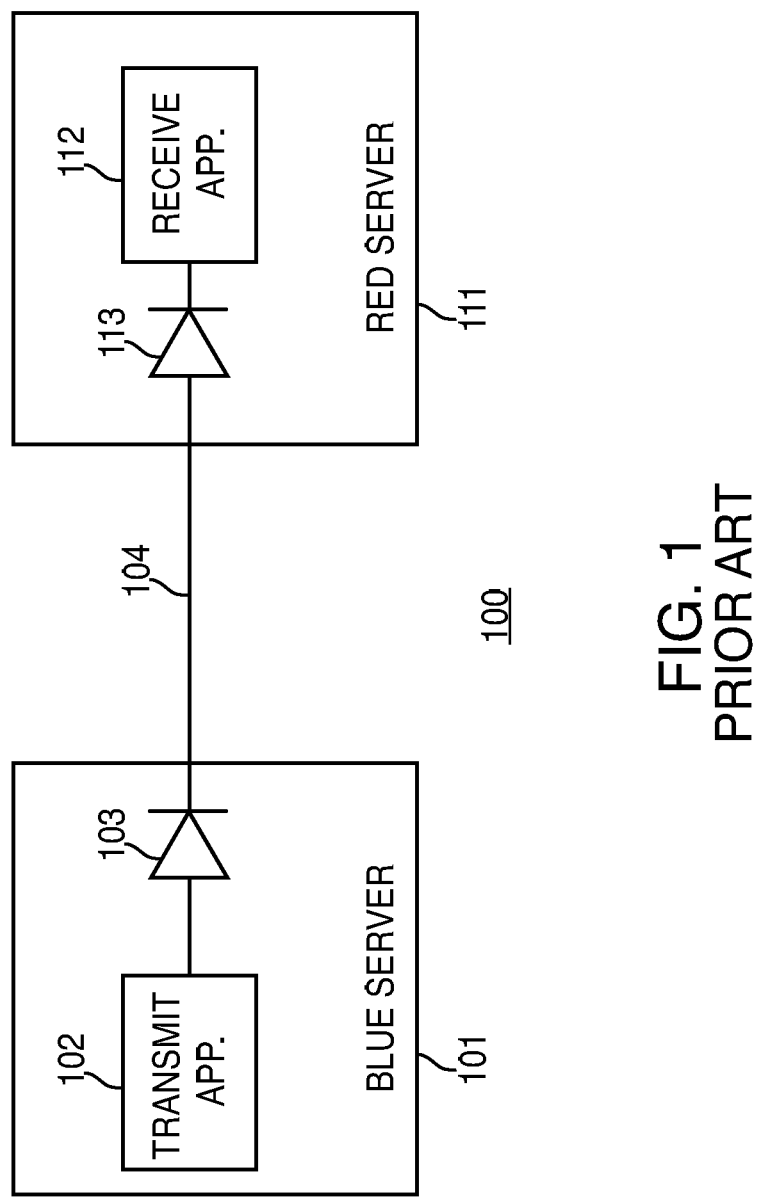
FIG. 1 is a block diagram of a conventional one-way data transfer system.
Figure 2:
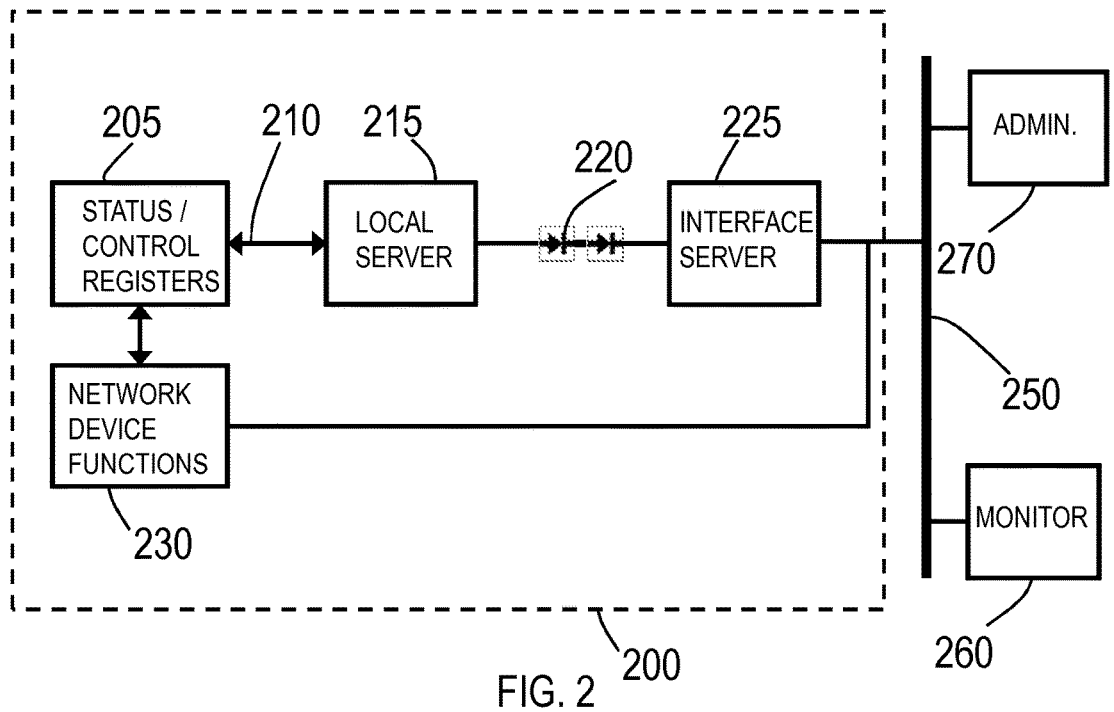
FIG. 2 is a block diagram of an embodiment of the present invention.

Referring now to the drawings and in particular to FIG. 2, a first preferred embodiment of a network device 200 is shown. Network device 200 is shown generically in FIG. 2 coupled to a network 250 and may be any type of device, including, but not limited to, a router, workstation, server, switch, bridge, hub, IP telephone, IP video camera, computer host, modem rack or printer. Network device 200 includes circuits 230 coupled directly to network 250 for providing all of the functionality of corresponding conventional device. As one of ordinary skill in the art will readily recognize, certain types of network devices, e.g., a router, switch or hub, may be coupled to more than one network but such connections are not shown in FIG. 2—only the connection to the particular network including a monitor 260 and/or an administrator 270 (discussed below) is shown. In some circumstances, it may be preferable to couple circuits 230 only to a different (separate) network or via a Virtual Private Network (VPN) to network 250. The functions performed by circuits 230 are controlled by a central processing unit (CPU), not shown, which uses status/control registers 205 both to control how the circuitry 230 operates and to provide status information (including but not limited to operational log files) relative to the operation of circuitry 230. Status/control registers 205 may also include identification information, e.g., the media access control (MAC) address for the device. In a conventional network device, an administrator may access the status registers by using a network management system (NMS) that communicates via SNMP with an agent software module running on the device—generally with full control over any modifiable status register or registers. As one of ordinary skill in the art will readily recognize, the status registers may comprise a conventional memory storing particular information at predefined memory addresses. Some conventional network devices may be configured to output SNMP Trap messages periodically. However, such devices may also be accessed using SNMP protocol by an administrator, and, as discussed above, all versions of SNMP can be subject to malicious attack.

Network device 200 overcomes the problems with such prior art devices. In one embodiment, network device 200 is configured to provide a one-way interface which periodically (i.e., on predetermined fixed intervals) outputs a preconfigured SNMP Trap message to a monitor 260 (e.g., a preconfigured network destination) coupled to network 250, but which prevents any access to the status registers. In particular, network device 200 includes a local server 215 which is coupled to the status registers 205 via an internal two-way link 210. Two-way link 210 allows local server 215 to read the information stored in status/control registers 205, either directly or by means of an intervening request/command. Local server 215 also has an output coupled to the input of a one-way data link 220 (comparable to the one-way data link discussed above and disclosed in U.S. Pat. No. 8,068,415). The output of the one-way data link 220 is coupled to an input of an interface server 225, which also has an output coupled to network 250. In operation, local server 215 is configured to periodically request and then receive predetermined information from the status/control registers 205, and then forward such information across the one-way data link 220 to the interface server 225. Interface server 225 is configured to receive the information via the one-way data link 220 and forward such information, e.g., as an SNMP Trap message, to monitor 260. Alternatively, interface server 225 (or local server 215) may be configured to only forward information that has changed, likely resulting in far fewer messages transmitted to monitor 260 in most circumstances. The information forwarded to the monitor 260 should include the desired status information for device 200 and identification information (e.g., the MAC address). In many network situations, it is desirable to monitor the status of a large number of devices coupled to a network. However, configuring an administrative server to query each device and generate a report based thereon can be very complicated and time-consuming. The one-way interface disclosed herein provides an easy and quick solution that can be configured at installation. A single monitor 260 placed on the network 250 may receive and compile information about each device 200 coupled to network 250, without any need to configure monitor 260 with information about each device (i.e., to request status information from each device). At the same time, the one-way interface is also immune to any malicious attacks, unlike conventional devices using SNMP, by either a third party hack (e.g., obtaining access information via network sniffing) or by a third party obtaining access to an administrator's terminal, since device 200 does not allow any outside access whatsoever for writing information to the status registers because of the use of one-way data link 220.

One-way data link 220, as discussed above, is a hardware enforced one-way data transmission pathway, e.g., an optical transmission system including an optical emitter (e.g., an LED) coupled to an optical link which, in turn, is coupled to an optical detector (e.g., a photodetector or photodiode). Local server 215 and interface server 225 are applications which may be implemented as part of the internal operating system for network device 200 or in hardware circuits (e.g., an FPGA or ASIC).

In another embodiment, network device 200 overcomes the prior art problems by including a memory in interface server 225 used for replicating all of the information stored in status/control registers 205. Interface server 225 is configured to allow an administrator 270 to obtain such information by a remote query (e.g., by addressing the IP address of the device 200). Interface server 225 may be configured to provide a user interface substantially similar to conventional network devices (a password protected admin control panel), but without any capability for changing any of the information stored within status/control registers 205 because of the one-way data link 220. Interface server 225 may only maintain the latest status information, discarding all previous status information, or alternatively, interface server 225 may include a data storage device and acts as a local historian, storing the status information and associated time/date information for longer periods of time (i.e., identifying information for the status information). The actual period depends on the size of the storage device and the amount of status information to be saved. As one of ordinary skill in the art will readily recognize, network device 200 thus allows an outside user to access the status information without any ability to directly access status/control registers 205 thereby preventing any malicious alteration of the operation of network device 200. Even though the user may access interface server 225, the one-way nature of data link 220 prevents any information from flowing to status/control registers 205.

In the preferred embodiment of the system shown in FIG. 2, network device 200 is preconfigured prior to installation, either at manufacture or via a separate configuration interface (not shown) to output a status information message to a monitor 260 coupled to network 250. The configuration interface may be via a dedicated separate connector or via the network connector but only accessible if an external switch is activated that allows access to the configuration interface. The separate configuration interface allows access to the status/control registers to allow custom configuration of network device 200 (in the manner typically allowed via a conventional administrative network control panel for a router, for example). This embodiment provides the most secure installation, because once the network device 200 is installed in the system, no external access is available, via network 250, to status/control registers 205.

Figure 3:
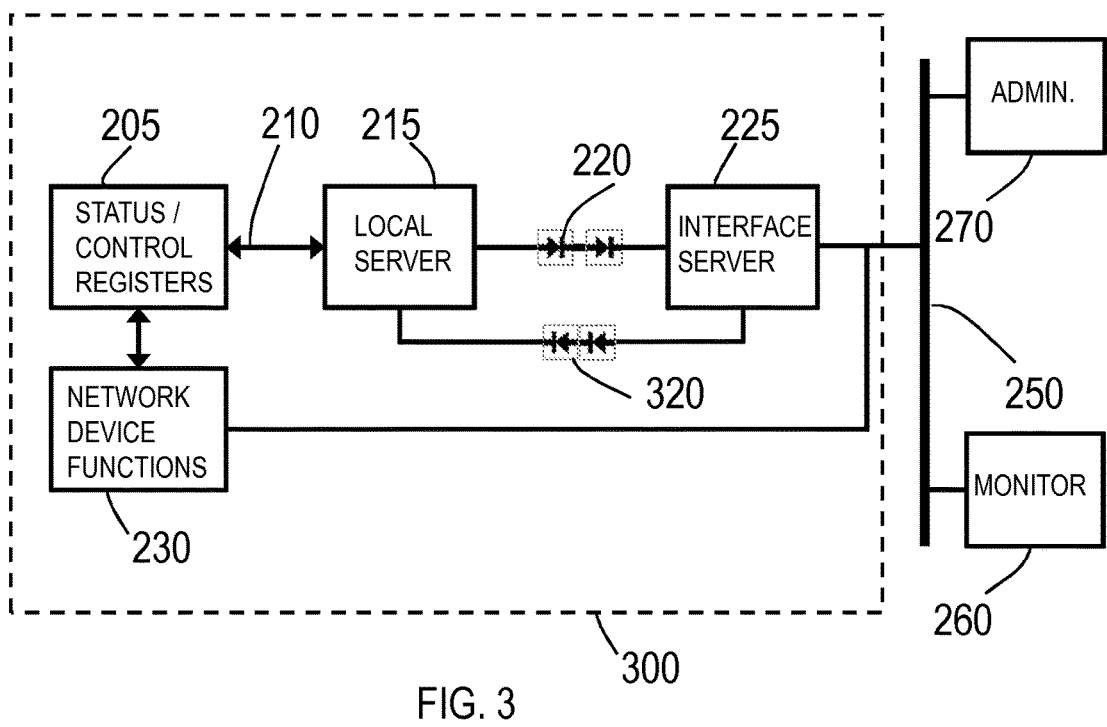
FIG. 3 is a block diagram of a further embodiment of the present invention.

Referring now to FIG. 3, in some situations, it may be necessary to allow administrative access to the status/control registers 205 via network 250. Thus, network device 300 in FIG. 3 includes an additional one-way data link 320 having an input coupled to the interface server 225 and an output coupled to local server 215. Network device 300 outputs status information to monitor 260 in the same way as network device 200 in FIG. 2. However, an administrator 270 may be coupled to network 250 (administrator 270 may be on the same computer as monitor 260 or on a separate computer) and may communicate with device 300 by using identifying information, e.g., the IP address of device 300. Preferably, a login screen is used to obtain access to network device 300, and communications between administrator 260 and network device 300 are preferably encrypted to deter network sniffing and related malicious attacks. Interface server 225 is configured to allow the administrator to change one or more of the status registers which conventionally have write-access. The interface server 225 is configured to receive, after a successful login, a command to change a particular one (or more) of the status registers, and forward such command, via one-way data link 320, to local server 215. Local server 215 is additionally configured to receive the command and forward it to status/control registers 205 (where it is carried out conventionally). The network device 300 is slightly more susceptible to malicious attack than network device 200 of FIG. 2. However, because communications between administrator 270 and network device 300 (which may be subject to network sniffing, even if encrypted) are likely to occur very infrequently, in comparison with communications between network device 300 and monitor 260, which occur periodically and regularly (and are not subject to network sniffing due to the push nature of such communications), the risk may be acceptable in situations where administrator access via the network to the status registers is absolutely necessary.

In a further embodiment, network device 300 may also be configured to allow administrator 270 to change the configuration settings controlling the type of status information output to monitor 260 as well as the timing (e.g., period between each transmission or to change to a setting whereby transmissions are only made when information has changed) for outputting such information. In this embodiment, interface server 225 is further configured to allow such parameters to be changed and to forward a command to make such changes to local server 215 via one-way data link 320. Local server 215, in turn, is further configured to receive the change command and modify/implement the preconfigured parameters based thereon.

Although the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A secure one-way interface for a network device, comprising:
   a network device having status registers for storing information, the network device adapted to be directly coupled to a network via a first connection to provide network device functionality, the network device configured to prevent access to the status registers via the first connection and to allow access to the status registers via a separate second connection;

a first server coupled to the status registers in the network device via the second connection to read the information stored in the status registers, the first server configured to read the information from the status registers and transmit the information on an output;

a one-way data link having an input coupled to the output of the first server and an output, the one-way data link configured to transfer data only from the input to the output and to prevent any signal from passing from the output to the input; and a second server having an input coupled to the output of the one-way data link and an output adapted to be directly coupled to the network, the second server configured to receive the information from the first server via the one-way data link, the second server further configured to transmit the information on the output to a predetermined network destination.

2. The secure one-way interface of claim 1, wherein the first server is configured to repeatedly read and transmit the information from the status registers on a predetermined basis.

3. The secure one-way interface of claim 2, wherein the predetermined basis is a predetermined fixed interval.

4. The secure one-way interface of claim 2, wherein the predetermined basis is a fixed schedule.

5. The secure one-way interface of claim 2, further comprising a second one-way data link having an input coupled to an output on the second server and an output coupled to an input on the first server, wherein the second server is further configured to allow a user to enter a command for changing the predetermined basis and to transmit the entered command to the first server via the second one-way device; and wherein the first server is further configured to receive the command via the second one-way data link and to change the predetermined basis.

6. The secure one-way interface of claim 1, wherein the first server includes a memory for storing the information and is configured to repeatedly read the information from the status registers at a predetermined fixed interval, to compare the read information with the stored information, and, only if the read information is different from the stored information, to forward the read information on the output and to replace the previously stored information with the read information.

7. The secure one-way interface of claim 1, wherein the second server includes a memory for storing the information and is configured to receive the information from the first server, to compare the read information with the stored information, and, only if the read information is different from the stored information, to transmit the read information on the output and to replace the previously stored information with the read information.

8. The secure one-way interface of claim 1, wherein the second server includes a storage device and wherein the second server is configured to store the received information along with identifying information on the storage device.

9. The secure one-way interface of claim 8, wherein the second server is configured to allow a user to request information via the second interface based upon the identifying information.

10. The secure one-way interface of claim 1, further comprising a second one-way data link having an input coupled to an output on the second server and an output coupled to an input on the first server, wherein the second server is further configured to allow a user to enter a command for changing at least part of the information stored in the status registers and to transmit the entered command to the first server via the second one-way device; and wherein the first server is further configured to receive the command via the second one-way data link and to cause the command to be executed.

11. The secure one-way interface of claim 10, wherein the second server is configured to require that the user enter a password before allowing the user to select or enter the command.

12. The secure one-way interface of claim 10, wherein the first server includes a memory for storing the information and is configured to repeatedly read the information from the status registers at a predetermined fixed interval, to compare the read information with the stored information, and, only if the read information is different from the stored information, to forward the read information on the output and to replace the previously stored information with the read information.

13. The secure one-way interface of claim 10, wherein the user communications to the second interface are encrypted.

14. The secure one-way interface of claim 1, wherein the information stored in the status register comprises status information and identification information.

15. The secure one-way interface of claim 14, wherein the identification information comprises a MAC address.

16. The secure one-way interface of claim 1, wherein the second server is configured to transmit the information in the form of an SNMP Trap message.

17. The secure one-way interface of claim 1, wherein the network device is one of a router, a workstation, a server, a switch, a bridge, a hub, an IP telephone, an IP video camera, a computer host, a modem rack or a printer.

18. A secure one-way interface for a network device, comprising:

a network device having status registers for storing information, the network device adapted to be directly coupled to a network via a first connection to provide network device functionality, the network device configured to prevent access to the status registers via the first connection and to allow access to the status registers via a separate second connection;

a first server coupled to the status registers in the network device via the second connection to read the information stored in the status registers, the first server configured to read the information from the status registers and transmit the information on an output;

a one-way data link having an input coupled to the output of the first server and an output, the one-way data link configured to transfer data only from the input to the output and to prevent any signal from passing from the output to the input; and a second server having an input coupled to the output of the one-way data link, a memory and an output adapted to be directly coupled to the network, the second server configured to receive the information from the first server via the one-way data link and store the information in the memory, the second server further configured to provide a user interface for allowing a user to read the stored information via the network.

19. The secure one-way interface of claim 18, wherein the second server is configured to require that the user enter a password before allowing the user to read the stored information.

20. The secure one-way interface of claim 18, wherein the network device is one of a router, a workstation, a server, a switch, a bridge, a hub, an IP telephone, an IP video camera, a computer host, a modem rack or a printer.

* * * * *